May 9, 1967
L. R. SHELL
3,318,372
EMERGENCY CONTROL SYSTEM FOR A HEAT PUMP AND METHOD
Filed June 21, 1965
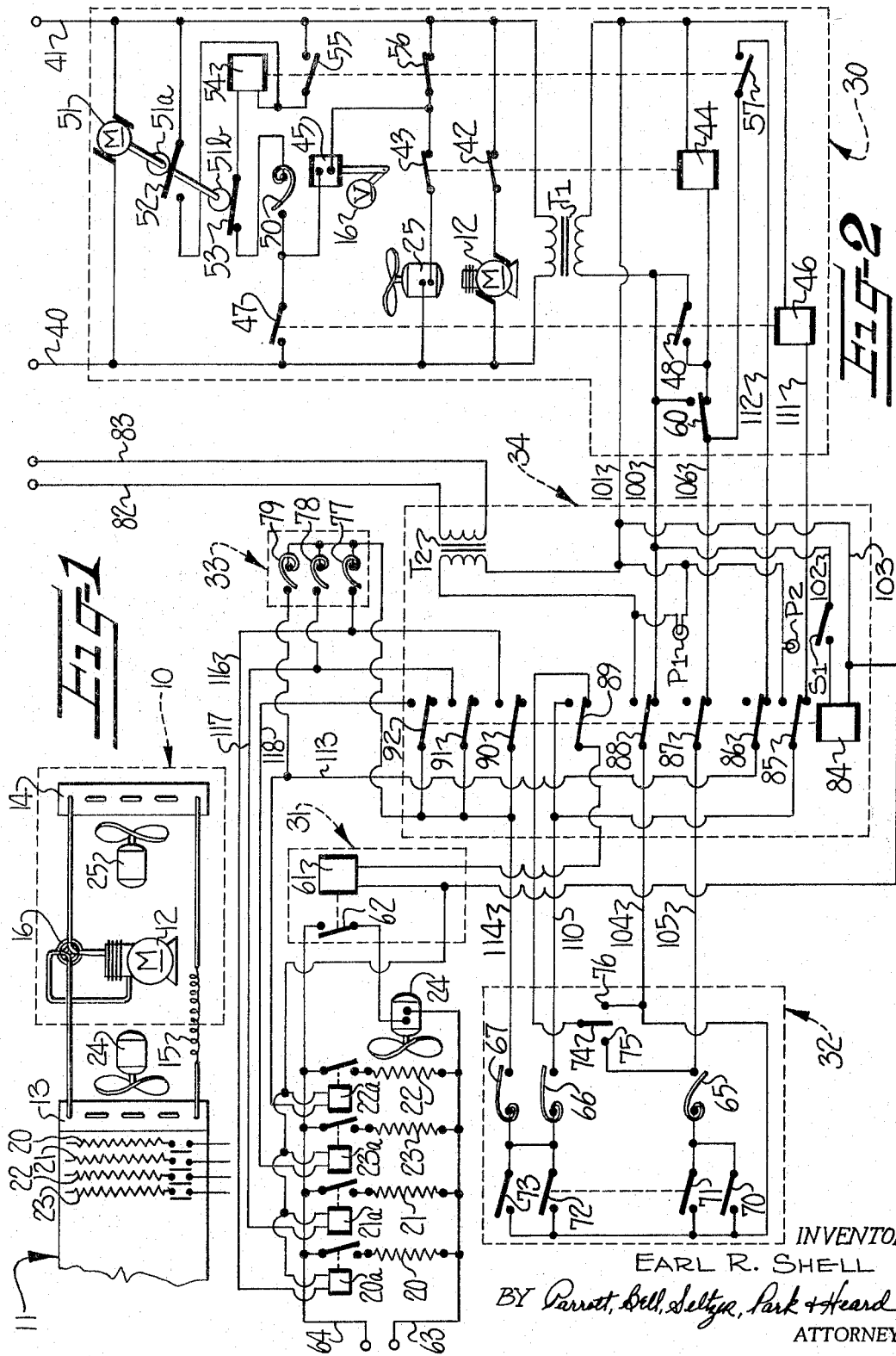
INVENTOR:
EARL R. SHELL
BY Parrott, Bell, Seltzer, Park & Heard
ATTORNEYS

United States Patent Office 3,318,372
Patented May 9, 1967

3,318,372
EMERGENCY CONTROL SYSTEM FOR A HEAT
PUMP AND METHOD
Earl R. Shell, Rte. 1, Box 196, Hudson, N.C. 28638
Filed June 21, 1965, Ser. No. 465,507
3 Claims. (Cl. 165—29)

This invention relates to air conditioning systems and is particularly directed to an emergency control system for a heat pump, which system provides heat for an area to be conditioned by the heat pump at such times that heat is required and the heat pump fails to transfer heat to the area.

A heat pump, as presently known, employs a mechanical compression refrigeration system to effect transfer of heat between an area to be conditioned and the ambient surroundings. When it is desired that the area be cooled, the refrigeration system is effective to transfer heat from the area to the ambient surroundings. Conversely, when it is desired that the area be heated, the refrigeration system, being reversible, transfers heat from the ambient surroundings to the conditioned area. When operating in the heating mode, a heat pump is required to transfer heat from the ambient surroundings to the area to be conditioned under a wide range of ambient temperatures. At relatively high outdoor temperatures, the transfer capacity of the refrigeration system is greater than the heat demand of the area to be conditioned, and the refrigeration system is cycled on and off by suitable temperature sensing means in the area to be conditioned. As the ambient temperature drops, a temperature eventually is reached at which the heat transfer capacity of the refrigeration system equals the heat demand of the area being conditioned, at which time the refrigeration system will run continuously. Should the ambient temperature continue to drop, auxiliary heat is required to meet the increasing heat demand of the area. Conventionally, such auxiliary heat is provided by auxiliary heaters, such as electrical resistance elements, energized in response to the temperature sensing means.

Thus, when the heat pump is operating in a heating mode, in response to a heat demand in the area to be conditioned, reliance is placed on the refrigeration system to provide at least a substantial portion of the heat transfer required to meet the heat demand. Further, in conventional heat pumps, the control of auxiliary heat is such that auxiliary heat is provided primarily only under circumstances in which ambient surroundings are at a relatively low temperature and the heat demand in the area to be conditioned is therefore high. In such a heat pump, should the mechanical compression refrigeration system fail for any reason, such as electrical or mechanical failure of the compressor, the refrigeration system will no longer effect a transfer of heat as required and the auxiliary heaters will not be operated. Thus, under such an emergency condition, no heating is provided for the conditioned area.

It is therefore a primary object of this invention to provide an improved method of and apparatus for controlling operation of a heat pump having an electrically operable drive motor and an electrically operable auxiliary heater, wherein the drive motor is energized in response to a first predetermined temperature condition in the area to be conditioned to normally cause the heat pump to transfer heat to the area to be conditioned, and wherein the auxiliary heater is energized in response to a predetermined temperature condition of the outdoor ambient surroundings, with the heater and the motor being successively deenergized in response to a second predetermined temperature condition in the area to be conditioned, and wherein, upon failure of the heat pump to transfer heat to said area when said first temperature condition calls for energization of the drive motor, the auxiliary heater is energized solely in response to said first predetermined temperature condition.

This object is realized by the provision of relay means interposed in the electrical control circuit of a heat pump and operable, upon the occurrence of an emergency condition, such as failure of electrical energization of the compressor or mechanical failure of the compressor, to disconnect the normal operative connection between the temperature sensing means and the mechanical refrigeration system and to establish a direct operative connection between the temperature sensing means and the auxiliary heating means.

A more specific object of the present invention is to provide, in combination with a heat pump having a mechanical refrigeration system, a thermostatic control means, and auxiliary heating means; an emergency control unit including relay means interposed between and normally operatively connecting the thermostatic control means, the auxiliary heating means and the mechanical refrigeration system, and which relay means is operable to interrupt the operative connection between the thermostatic control means, the auxiliary heating means and the mechanical refrigeration system upon the occurrence of an emergency failure of the mechanical refrigeration system and to simultaneously effect an operative connection between the thermostatic control means and the auxiliary heaters independently of the refrigeration system.

Some of the objects of the invention having been stated, other objects will appear as the description proceeds when taken in connection with the accompanying drawings, in which:

FIGURE 1 is a schematic representation of the heat transfer elements of a heat pump to which the present invention is applied; and FIGURE 2 is a schematic wiring diagram of the heat pump incorporating the emergency control system of the present invention.

Referring more particularly to the drawings, as schematically represented in FIGURE 1, a heat pump generally comprises a mechanical compression refrigeration system, which preferably includes an outdoor unit indicated generally at 10 and an indoor unit, indicated generally at 11. Conventionally, a compressor 12, which is preferably a hermetically sealed and self-contained compressor, is positioned in the outdoor unit 10. Two heat transfer coils 13, and 14 are provided, with a first coil 13 positioned in the indoor unit 11 and a second coil 14 positioned in the outdoor unit 10. The heat transfer coils 13, 14 are operatively connected together through a suitable expansion device 15, which may be an arrangement of expansion valves or a capillary tube as is well known to those familiar with the art.

Each transfer coil 13, 14 is operatively connected to compressor 12, to complete a closed circuit of flow for a suitable refrigerant gas, through a suitable reversing valve 16 which is effective to reverse the function of the heat transfer coils in order to vary the mode of operation of the mechanical compression refrigeration system for heating or cooling cycles as required. More specifically, with the reversing valve 16 in a normal position, the heat pump functions to cool the area to be conditioned by transferring heat therefrom to the ambient surroundings. Accordingly the first heat transfer coil 13, within indoor unit 11, is connected to the inlet of compressor 12 and serves as an evaporator coil for the mechanical refrigeration system, to be cooled by the flow of refrigerant gas therethrough.

Similarly, in normal operation the second heat transfer coil 14, positioned in the outdoor unit 10, is connected to the outlet of compressor 12 to receive hot gas therefrom at a relatively high pressure and to serve as a condensing coil for the mechanical refrigeration system.

Conversely, with the reversing valve means 16 in the alternate position, the first heat transfer coil 13 is connected to the outlet of compressor 12 to receive therefrom hot refrigerant gas and serve as a condenser coil for the refrigeration system. The second heat transfer coil 14 then is connected to the inlet of compressor 12, and serves as an evaporator coil for the mechanical refrigeration system. Thus, the mechanical refrigeration system is operated in a heating mode, to transfer heat from the ambient surroundings and meet the heat demand of the area to be conditioned.

In order to adequately meet the heating demand of the indoor area under ambient surrounding conditions when the effective transfer rate of the refrigeration system is not sufficient, auxiliary heaters in the form of electrical resistance units 20, 21, and 22, are provided and positioned in the indoor unit 11 immediately adjacent the first transfer coil 13. Such auxiliary heaters are generally known as strip heaters and are usually positioned in the duct communicating with the area to be conditioned. Further, in order to promote the transfer of heat to and from the conditioned area and the ambient surroundings, first and second fans and associated fan motors 24, 25, respectively, are provided to induce flow of air through the respective heat transfer coils 13, 14. Due to the placement of the fans in the indoor unit 11 and outdoor unit 10, they are conventionally referred to as an indoor fan and motor 24 and an outdoor fan and motor 25.

In order to provide for proper and desired operation of the heat pump, electrical control circuitry, as schematically illustrated in FIGURE 2, is provided for controlling the actuation of the various operating instrumentalities of the heat pump. Inasmuch as the control circuitry is conventionally divided into several subsystems, which are operatively connected in order to obtain the desired overall control, it is considered desirable to first describe the various electrical circuit components with respect to these sub-systems, before entering into a discussion of the operation of the control system and heat pump in accordance with the present invention.

Referring now more specifically to FIGURE 2, the various sub-systems of the electrical control system for the heat pump are enclosed in dash-dot line boxes for purposes of clarity. The subsystems include an outdoor unit control indicated generally at 30, an indoor fan control indicated generally at 31, a conditioned area temperature sensing unit indicated generally at 32, an outdoor temperature sensing unit indicated generally at 33 and an emergency control unit indicated generally at 34.

The outdoor unit control 30 is preferably positioned within the outdoor unit 10. Line voltage is supplied to the oudoor unit control through lines 40, 41, which may be attached to any suitable disconnect or fuse means (not shown). This line voltage is applied to the motor M of compressor 12 and the outdoor fan 25, through relay contacts 42, 43, respectively, the associated armatures of which are controlled by a thermostatically controlled relay coil 44. Operation of the heat pump in the heating or cooling mode, by varying the position of the reversing valve means 16, is controlled by a reversing valve solenoid 45 to which the line voltage present on lines 40, 41 may be applied in certain operating conditions of the heat pump.

The application of voltage to the reversing solenoid 45 to vary the operating mode of the heat pump between heating and cooling modes, is controlled by a combination of the electrical connections effected by (a) heating-cooling relay 46 and the armatures and contact sets 47 and 48 operated thereby; (b) a defrost thermostat 50 positioned closely adjacent the second heat transfer coil 14; (c) a defrost timer motor 51 and the associated contact sets 52, 53 operated thereby; and (d) a defrost relay 54 which has armatures and contact sets 55, 56 and 57 associated therewith and operated thereby to control defrost cycles of the mechanical refrigeration system. The line voltage applied to lines 40 and 41 is applied to a first or primary winding of a transformer T1, with the secondary winding thereof effective to apply a control voltage lower than the applied line voltage, such as a 24-volt control voltage, to portions of the electrical control system of the heat pump. The outdoor unit control 30 additionally includes a pressure responsive switch 60, operated in response to pressure conditions present at the compressor 12 and effective to remove the line voltage from the compressor 12 under improper pressure conditions occurring during operation in the cooling mode, as excessive heat pressure or improperly low suction pressure, as generally well known in mechanical refrigeration system controls.

The indoor fan control 31 includes an indoor fan relay 61 and an associated armature and contact set 62 which controls the application of line voltage present on the lines 63, 64 to the indoor fan motor 24, and is in turn controlled by other elements of the electrical control system, as will be later described.

The temperature sensing unit 32 is psoitioned within the conditioned area and is effective to govern the operation of the overall control system for the heat pump in order to provide the desired heating or cooling effect in the conditioned area. Temperature sensing unit 32 includes (a) a cooling thermostat 65; (b) a first heating thermostat 66; (c) a second heating thermostat 76; and (d) a heat pump function switch including contact sets 70-73 effective to govern operation of the heat pump in the cooling mode or the heating mode, or to provide automatic selection of the operating mode of the heat pump in response to the sensed temperature conditions within the area to be conditioned.

An indoor fan function switch 74 is also provided to permit indoor fan 24 to be energized continuously or only as the transfer of heat is being effected by the heat pump. More particularly, when indoor fan function switch 74 is positioned to provide connection with a terminal 75, in series with the cooling thermostat 65, the fan is operated only as the transfer of heat takes place in cooling mode operation. When the indoor fan function switch 74 is moved to connect with a terminal 76, the indoor fan is operated continuously in normal operation without regard to the transfer of heat taking place.

The outdoor temperature sensing unit 33 is positioned outside the conditioned area and includes thermostats 77, 78, 79 to sense the temperature conditions of the ambient surroundings, so as to normally energize the associated auxiliary heaters 20, 21, and 22 only in such ambient temperature conditions in which the heat transfer effected by the mechanical refrigeration system is inadequate to meet the heat demand of the area to be conditioned under normal operation of the heat pump.

The emergency control system 34 of the present invention is interposed among the control sub-systems previously described with reference to the circuitry enclosed within boxes 30, 31, 32, 33 and comprises a transformer T2, with a primary winding of the transformer connected to a source of line voltage through lines 82-83 and a secondary winding of the transformer T2 supplying a control voltage equal to the control voltage developed at the secondary winding of transformer T1. The emergency control system additionally comprises an emergency relay 84, operative to control the electrical connection of eight associated armtaure and contact sets, indicated at 85, 86, 87, 88, 89, 90, 91, 92. As will be described in greater detail hereinafter, the respective armatures and contact sets 85–92 are effective to modify the connection of the various control sub-systems among which the control device 34 is interposed. The control device 34 also includes a pilot lamp P1 operative to indicate the energization of the transformer T2, and a second pilot light P2 which is energized upon the occurrence of an emergency condition to indicate operation in an emergency mode.

METHOD OF OPERATION (*Cooling mode*)

The operation of the heat pump and control system as illustrated in FIGURE 2 will first be described with respect to normal operation in a cooling mode, with line voltage present at all line connections. During operation in a normal cooling mode, the control voltage developed across the secondary winding of transformer T1 is applied, through the lines 100, 101 and thence through lines 102, 103 and a manually operable emergency condition switch S1, to the coil of emergency control relay 84, to draw the associated armatures 85–92 to the downward position, as illustrated in FIGURE 2. Thus, an operative connection is established from line 100 to line 104, to apply the control voltage to the conditioned area temperature sensing unit 32.

For operation in a cooling mode only, selection switch 70 is manually closed to permit the control voltage to be applied to cooling thermostat 65.

As the conditioned area warms, cooling thermostat 65 will close upon a rise in temperature to apply control voltage to line 105 which is operatively connected by the armature 87 and associated contacts of the emergency control relay 84, to the line 106. Since pressure switch 60 is normally closed and is open only upon the occurrence of an improper compressor pressure, the control voltage present at the line 106 is applied to the starter control relay 44, to close the associated contacts 42, 43 and apply line voltage to compressor 12 and outdoor fan 25. Thus, normal operation of the mechanical refrigeration system in the cooling mode is initiated and cycled under the control of the cooling thermostat 65 to meet the cooling demands of the area to be conditioned.

METHOD OF OPERATION (*Heating mode*)

For operation in the heating mode, manual switch 70 is opened and manual switch 73 is closed. Thus, control voltage is applied to the first and second heating thermostats 66, 67. Upon a temperature drop to a predetermined temperature condition requiring heat to be supplied to the area to be conditioned, the first heating thermostat 66 will first close, to apply control voltage to the line 110 which is operatively connected, by the armature 85 and associated contacts of the emergency control relay 84, to the line 111. Application of control voltage to the line 111 energizes relay 46, to close the associated contacts 47, 48. The closure of the contact 47 applies line voltage to the reversing valve solenoid 45, through the normally closed contact 56, and changes the position of reversing valve 16 to reverse the operative connection of the first and second heat transfer coils 13 and 14 to the outlet and inlet of compressor 12, as heretofore described. Additionally, line voltage is applied to defrost thermostat 50, which is positioned closely adjacent the second heat transfer coil 14, and the defrost system, including the defrost thermostat 50, the defrost timer motor 51, and the defrost relay 54, becomes operative.

Such a defrost control provision must be made due to certain characteristics of the operation of the heat pump in a heating mode. As will be understood, in order to affect the transfer of heat from the ambient surroundings into the conditioned area, the second heat transfer coil 14, which is positioned in the ambient surroundings, must be cooled to a temperature below that of the ambient surroundings. As the coil 14 is cooled to below freezing temperatures, and in the event that high humidity conditions are present in the ambient surroundings, moisture will condense out of the ambient air and form ice on coil 14, to severely limit the transfer of heat to that coil and thus markedly detract from the efficiency of the mechanical refrigeration system. In order to counteract such a loss of efficiency, the heat transfer coil 14 must from time to time be defrosted. This is accomplished by the combined operations of the circuit elements mentioned briefly above.

More particularly, when the defrost thermostat 50 senses a temperature at the heat transfer coil 14 indicative of the presence of an iced condition, thermostat 50 closes to apply line voltage, through the defrost timer motor contact 53 to the defrost relay 54, provided that the constantly driven timer motor 51 has positioned the cams 51a, 51b driven thereby to place contacts 52 and 53 in proper positions. On a change of state of the defrost relay 54, the associated contact 55 closes to hold relay 54 in an energized position until such time as the associated contact 53 is opened by movement of cam 51b, over a predetermined time interval determined so as to not cause excessive operation of the heat pump in the cooling mode during a time when the pump would normally be required to operate in the heating mode.

The associated normally closed contact 56 of defrost relay 54 is opened to deenergize outdoor fan 25 and stop the flow of air through heat transfer coil 14 in order to promote prompt melting of the ice thereon. Contact 57 is closed to apply control voltage through the line 112, the armature 86 and associated contacts of the emergency control relay 84 and the line 113, to energize a heating element relay 22a to provide heating for the conditioned area during the time that the first transfer coil 13 operates as an evaporator coil and the conditioned area air moving through the indoor unit 11 would otherwise be cooled.

Should the heat demand in the conditioned area increase to a degree that the transfer effected by mechanical refrigeration, under the operation outlined above, is not effective to meet the heat demand, the second heating thermostat 67 will close upon a temperature drop to a predetermined temperature condition, to apply control voltage to the line 114. With the presence of control voltage on the line 114, control voltage is applied to the line 115, connected to the outdoor thermostats 77, 78, 79. Should the temperature conditions of the ambient surroundings, as sensed by the outdoor thermostats, be sufficiently low to cause the first outdoor thermostat 77 to be closed, control voltage is applied to the line 116, to energize a resistance heater relay 20a and apply line voltage to the corresponding first resistance heater element 20, and thereby meet the increased heating demand. On successive drops of ambient temperature, the second and third outdoor thermostats 78, 79 will close to thereby apply control voltage to the corresponding lines 117, 113, energizing the resistance heater relays 21a, 22a connected to those lines, and thus applying line voltage to the corresponding second and third resistance heaters 21 and 22, to meet the increasing heating demand under those conditions. As will be understood, even while the first heating thermostat 66 remains closed, to operate the mechanical refrigeration system continuously to transfer heat at all times, the second heat thermostat 67 will cycle in response to sensed conditions within the area to be conditioned, and vary the energization of the resistance heaters as required to meet the heat demand.

As will be understood, although the description of operation of the cooling thermostat 65 and the heating switches 70, 73 were closed, respectively, to obtain operation in the respective heating or cooling mode as desired, the interconnected switches 71 and 72 may both be closed simultaneously, in order to permit selection of operation in the cooling or heating mode to be obtained by the operation of the cooling thermostate 65 and the heating thermostats 66, 67. When thus operated, the changeover of the system from the cooling mode to the heating mode of operation is entirely automatic, responsive to conditions within the area to be conditioned.

METHOD OF OPERATION
*(Emergency condition)*

The operation of the heat pump and control system as detailed to the present point is substantially conventional, and assumes that no difficulties will occur in the operation of the refrigeration system to effect the transfer of heat from the ambient surroundings to the area to be conditioned when the heat pump is operating in the heating mode. Upon the occurrence of an emergency condition, such as the failure of the refrigeration system, the emergency control system 34, which is of primary concern in the present invention, becomes operative. As explained earlier, the coil of the emergency relay means 84 in the emergency control system is energized by the control voltage developed in the secondary winding of transformer T1, in the presence of line voltage as applied to the lines 40, 41 of the outdoor unit control 30, to effect a normal operative connection of the various control sub-systems 30, 31, 32, and 33 of the heat pump control system. Upon failure of the line voltage applied to the transformer T1, through blown fuses in the lines supplying that line voltage, due to electrical failure of some component of the outdoor unit 10, primarily the compressor 12, or for any other electrical failure reason, the control voltage energizing the coil of relay 84 is no longer present. Thus, upon electrical failure of the refrigeration system, and particularly of the compressor 12, the eight associated armatures and contact sets 84–92 controled by relay 84 will change state, and vary the operative connection of the control sub-systems in order to provide heating for the area to be conditioned, even though the transfer of heat by the refrigeration system is no longer occurring.

More particularly, the control voltage of the secondary winding of transformer T2 is applied, by the armature 88 and associated contact set, to the line 104 and thence to the heating thermostats 66 and 67, to provide a control voltage effective to operate the required elements to supply emergency heat. By the change in state of the armature 89 and its associated contact set, the line voltage present on the line 110, due to a closed condition of the first heating thermostat 66 upon a tempearture drop to a predetermined temperature condition, is applied to the indoor fan relay coil 61, to cause the indoor fan motor 24 to be energized and circulate air within the conditioned area. The line voltage present on the line 114, upon closing of the second heating thermostat 67 upon a further temperature drop to a second predetermined temperature condition in the conditioned area, is applied by the armatures 90, 91, 92 and associated contact sets directly to the lines 116, 117, and 118, and the heater relays 20a, 21a, 23a are therefore directly under the control of the second heating thermostat 67. As heating is thus called for in the conditioned area, the relay coils 20a, 21a, and 23a are energized, to apply line voltage to the corresponding first and second resistance heaters 20, 21, and to apply line voltage to a fourth, or emergency condition, resistance heater 23. The fourth resistance heater 23 is energized only during operation in emergency conditions, and not in normal heating mode operation.

The operative connections of the cooling thermostat 65 and line 105 in series therewith and the heating thermostat lines normally connected to the outdoor unit control 30 are disconnected in order to prevent improper actuation of the various relays and control elements of the outdoor unit control 30. Further, the first and second outdoor thermostats 77, and 78 are by-passed, in order to provide direct control of the associated resistance heaters 20, 21. The third outdoor thermostat is not by-passed, and maintains control over the third resistance heater 22, in order to provide additional emergency heat when required by a drop in outdoor ambient temperature and increased heat demand created thereby in the conditioned area.

As a result of the change in state of the armature 85, control voltage is applied to pilot light P2 to indicate that the system is operating under an emergency condition, and the application of control voltage to the heating-cooling relay 46 is prevented, thereby preclude an undesired change in mode to be indicated to the outdoor unit control 30.

Should the compressor 12 of the refrigeration system fail mechanically such as by a broken crank shaft or fractured valves within the compressor, to thus render ineffective any transfer of heat by the refrigreation system, an operator may open the normally closer emergency switch S1, to thus provide the same emergency condition operation even though a control voltage may still be present at the secondary winding of transformer T1.

It is thus seen that the control system for the heat pump comprises a first temperature sensing unit 32 adapted to be positioned in an area to be conditioned and a second temperature sensing unit 33 adapted to be positioned in the outdoor ambient surroundings. It can be stated that the electrical control includes three stages, the first of which is that portion of the circuit of FIGURE 2 which electrically connects the first temperature sensing unit 32 to the drive motor M of compressor 12 and the outdoor fan 25, and is operable to energize the drive motor in response to the sensing of a first predetermined temperature condition by the first sensing unit. The second electrical circuit stage is that portion of the circuit which operatively connects the second temperature sensing unit 33 to the heaters 20, 21, 22 of the auxiliary heating means and is operable in response to the sensing of predetermined temperature conditions of the outdoor ambient by the second sensing unit 33 for energizing the auxiliary heating means. The third stage of the electrical circuitry comprises those elements operatively connecting the second sensing unit 33 in series with the first sensing unit 32 and the auxiliary heating means and in parallel with the first circuit stage so that the armatures 85–92 of relay 84 are interposed in and normally maintain the connection between the first and second circuit stages and also are interposed in the first circuit stage and normally maintain the connection between the first temperature sensing unit 32 and the drive motor M, for example.

Thus, upon failure of the first sensing unit 32 to be able to energize the drive motor 12 in response to the sensing of a given temperature condition, the armatures 85–92 of relay 84 interrupt the third stage connection between said first and second circuit stages while interrupting the connection between the first sensing unit 32 and the drive motor M and substantially simultaneously establishing a direct electrical connection between the first sensing unit 32 and the auxiliary heaters 20, 21, 23 and by-passing the second sensing unit 33.

In the drawings and specification there has been set forth a preferred embodiment of the invention and, although specific terms are employed, they are used in a generic and descriptive sense only and not for purposes of limitation, the scope of the invention being defined in the claims.

I claim:
1. A heating system protected against failure to transfer heat to a conditioned area in response to a temperature therein below a desired temperature comprising:
an electrically energizable heat pump for transferring heat to the conditioned area,
an electrically energizable auxiliary heater for transferring heat to the conditioned area,
first and second temperature sensitive electrical switches in the conditioned area respectively responsive to temperatures below a first predetermined temperature and to temperatures below a second predetermined temperature lower than said first predetermined temperature, a third temperature sensitive electrical switch in the outdoor ambient atmosphere responsive to temperatures below a third predetermined temperature, and emergency control means interposed among and electrically interconnecting said heat pump, said auxiliary heater, and said first, second and third switches; said means normally connecting said first switch to said heat pump for controlling the energization thereof and said second and third switches in series connection to said auxiliary heater for controlling the energization thereof and, upon the occurrence of an emergency condition, disconnecting said heat pump and said auxiliary heater respectively from said first and third switches and connecting said second switch to said auxiliary heater for controlling the energization thereof so that said first switch normally controls the transfer of heat from said heat pump while said second and said third switches together normally control the transfer of heat from said auxiliary heater and so that, upon the occurrence of an emergency condition, said second switch controls the transfer of heat from said auxiliary heater.

2. A heating system according to claim 1 wherein said heat pump includes a first control voltage transformer normally connected through said emergency control means to supply a control voltage switched by said first, second and third switches and wherein said emergency control means includes a second control voltage transformer connected, upon the occurrence of an emergency condition, to supply a control voltage switched by said second switch.

3. A heating system according to claim 1 wherein said emergency control system includes a multiple contact electrical relay for varying the interconnection of said switches, said heat pump and said auxiliary heater, which relay is responsive to the presence of an electrical voltage for energization of said heat pump.

References Cited by the Examiner

UNITED STATES PATENTS

| 2,468,626 | 4/1949 | Graham | 165—29 |
| 2,672,734 | 3/1954 | Ditzler et al. | 165—29 |
| 3,173,476 | 3/1965 | McGready | 165—29 |

ROBERT A. O'LEARY, *Primary Examiner.*

CHARLES SUKALO, *Examiner.*

UNITED STATES PATENT OFFICE
CERTIFICATE OF CORRECTION

Patent No. 3,318,372                                    May 9, 1967

Earl R. Shell

It is hereby certified that error appears in the above numbered patent requiring correction and that the said Letters Patent should read as corrected below.

Column 3, line 36, for "subsystems" read -- sub-systems --; column 4, line 23, for "psoitioned" read -- positioned --; column 6, line 64, strike out "of the cooling thermostat 65 and the heating" and insert instead -- as detailed above has assumed that the manual --; line 69, for "thermostate" read -- thermostat --; column 7, line 29, for "controled" read -- controlled --; column 8, line 12, for "closer" read -- closed --.

Signed and sealed this 14th day of November 1967.

(SEAL)
Attest:

EDWARD M. FLETCHER, JR.
Attesting Officer

EDWARD J. BRENNER
                                               Commissioner of Patents